United States Patent
Nerius et al.

(10) Patent No.: US 11,106,763 B2
(45) Date of Patent: Aug. 31, 2021

(54) SYSTEMS AND METHODS FOR TRANSACTION-BASED LICENSING

(71) Applicant: ServiceNow, Inc., Santa Clara, CA (US)

(72) Inventors: Joshua Timothy Nerius, Chicago, IL (US); Venkata Kiran Kumar Koya, Poway, CA (US); Rebecca Anita Dias, Seattle, WA (US); David J. Terry, San Jose, CA (US); Parvathavardhini Shankaranarayanan, Union City, CA (US); Jeremy Michael Charfauros, San Diego, CA (US); Karthik Karunakar Kotian, San Diego, CA (US); Andrew Whitley Strieber, Encinitas, CA (US)

(73) Assignee: ServiceNow, Inc., Santa Clara, CA (US)

(*) Notice: Subject to any disclaimer, the term of this patent is extended or adjusted under 35 U.S.C. 154(b) by 82 days.

(21) Appl. No.: 16/704,585

(22) Filed: Dec. 5, 2019

(65) Prior Publication Data

US 2020/0302034 A1   Sep. 24, 2020

Related U.S. Application Data

(63) Continuation of application No. 16/370,148, filed on Mar. 29, 2019, now Pat. No. 10,503,879.
(Continued)

(51) Int. Cl.
*G06F 21/10* (2013.01)
*H04L 29/06* (2006.01)
*G06F 16/23* (2019.01)

(52) U.S. Cl.
CPC ........ *G06F 21/105* (2013.01); *G06F 16/2379* (2019.01); *H04L 63/10* (2013.01); *G06F 2221/0773* (2013.01)

(58) Field of Classification Search
CPC combination set(s) only.
See application file for complete search history.

(56) References Cited

U.S. PATENT DOCUMENTS

| 6,321,229 B1 | 11/2001 | Goldman |
| 7,020,706 B2 | 3/2006 | Cates |
| 8,151,261 B2 | 4/2012 | Sirota |

(Continued)

FOREIGN PATENT DOCUMENTS

| EP | 004556611-0001 | 2/2018 |
| EP | 004556611-0002 | 2/2018 |
| EP | 004556611-0003 | 2/2018 |

(Continued)

*Primary Examiner* — Harris C Wang
(74) *Attorney, Agent, or Firm* — Fletcher Yoder, P.C.

(57) ABSTRACT

The present disclosure relates to a transaction licensing system (TLS) for managing transactions and entitlements in a cloud-based system, wherein a transaction is a communication with an external server. The TLS includes at least one transaction licensing database (TLDB) that is configure to store entitlement and transaction data. The entitlements may include a general entitlement pool, as well as specialized entitlement pools with entitlements for executing particular transactions. The TLS is configured to determine identifying information for a transaction and then use this information to determine whether the general or specialized entitlement pools associated with the transaction has entitlements available in the TLDB to execute the transaction. When a suitable entitlement is determined to be available, the transaction is executed and the general or specialized entitlement pool is appropriately decremented. When no suitable entitlements are available, the TLS returns an exception.

20 Claims, 8 Drawing Sheets

Related U.S. Application Data

(60) Provisional application No. 62/820,543, filed on Mar. 19, 2019.

(56) References Cited

U.S. PATENT DOCUMENTS

| | | | |
|---|---|---|---|
| 8,561,151 B2 | 10/2013 | Dorsey | |
| 8,636,093 B2 | 2/2014 | Myers | |
| 9,064,126 B2 * | 6/2015 | Pruss | G06F 21/62 |
| 9,065,783 B2 | 6/2015 | Ding | |
| 9,122,552 B2 | 9/2015 | Whitney | |
| 9,535,737 B2 | 1/2017 | Joy | |
| 9,882,827 B2 | 1/2018 | Fall | |
| 2004/0055002 A1 * | 3/2004 | Das | G06F 9/5055 |
| | | | 718/107 |
| 2005/0055382 A1 * | 3/2005 | Ferrat | G06F 16/27 |
| 2011/0296429 A1 * | 12/2011 | Segmuller | G06F 21/105 |
| | | | 718/104 |
| 2014/0380499 A1 | 12/2014 | Pruss | |
| 2015/0263890 A1 * | 9/2015 | Fall | H04L 41/22 |
| | | | 709/226 |
| 2017/0308685 A1 * | 10/2017 | Terry | G06F 21/52 |
| 2017/0310547 A1 | 10/2017 | Lin | |
| 2018/0321927 A1 * | 11/2018 | Borthakur | G06F 8/62 |
| 2021/0117513 A1 * | 4/2021 | Kapoor | G06F 21/125 |

FOREIGN PATENT DOCUMENTS

| | | |
|---|---|---|
| EP | 004556611-0004 | 2/2018 |
| EP | 004556611-0005 | 2/2018 |
| EP | 004556611-0006 | 2/2018 |
| EP | 004556611-0007 | 2/2018 |
| EP | 004556611-0008 | 2/2018 |

* cited by examiner

SYSTEMS AND METHODS FOR TRANSACTION-BASED LICENSING

CROSS REFERENCE TO RELATED APPLICATIONS

This application is a continuation of U.S. patent application Ser. No. 16/370,148, filed Mar. 29, 2019, which claims priority from and the benefit of U.S. Provisional Application Ser. No. 62/820,543, entitled "SYSTEMS AND METHODS FOR TRANSACTION-BASED LICENSING," filed Mar. 19, 2019, both of which are herein incorporated by reference in its entirety for all purposes.

BACKGROUND

The present disclosure relates generally to transaction-based licensing and, more specifically, to implementing transaction-based licensing in a cloud computing system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In certain situations, a client instance hosted by the cloud computing service may exchange information with external systems or services. For example, the client instance may make a HyperText Transfer Protocol (HTTP) request to an external server to request data for importation into a database associated with the client instance. The cloud computing service may be designed to track each outbound communication to the external system as a transaction. Additionally, the cloud computing service may have a licensing strategy in which each client instance is allotted a predetermined number of transactions based on a purchased licensing plan. As such, it is recognized that there is a need to provide an improved system for allotting and tracking transactions in a cloud computing service.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a transaction licensing system (TLS) that manages transaction-based licensing in a cloud-based platform. The TLS includes an integration hub (IH) having instructions that enable the identification, execution, and tracking of transactions. Each transaction is an outbound communication with an external system using one of the protocols available to the IH, such as Representational State Transfer (REST), Simple Object Access Protocol (SOAP), Java Database Connectivity (JDBC), Secure Shell (SSH), and PowerShell. Customers can purchase access to the IH, which includes a general pool of entitlements that can be used to execute a predefined number of transactions. When customers use integration actions in their business processes/flows, transaction entitlements are generally consumed from this general entitlement pool.

However, certain applications (e.g., scripts, flows) may include actions with IH functionality. When these applications are executed by the client instance or by a measurement, instrumentation, and discovery (MID) server associated with the client instance, it may be desirable that the resulting transactions are counted against a specialized entitlement pool that is particular to the application, rather than the customer's general entitlement pool. To enable this functionality, the disclosed TLS determines identifying information for a transaction, such as the application or spoke associated with the transaction, the protocol of the transaction, the calling scope of the transaction, and the action associated with the transaction. The TLS then uses this information to identify suitable entitlements in the general entitlement pool, or in a specialized entitlement pool, available for the transaction to be executed. When a suitable specialized entitlement pool is available, an entitlement from the specialized entitlement pool is consumed to perform the transaction. When a specialized entitlement pool is not available and general entitlement pool is available, an entitlement from the general entitlement pool may be consumed to perform the transaction. Additionally, transaction information may be stored in a number of transaction licensing databases (TLDBs) of the TLS, such as a TLDB hosted by the client instance, a TLDB hosted by the MID server, and a TLDB hosted by a central usage analytics (UA) instance. As such, TLS is designed to propagate transaction information from the client instance to the central UA instance, from the MID server to the client instance, and/or from the MID server to the central UA instance.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
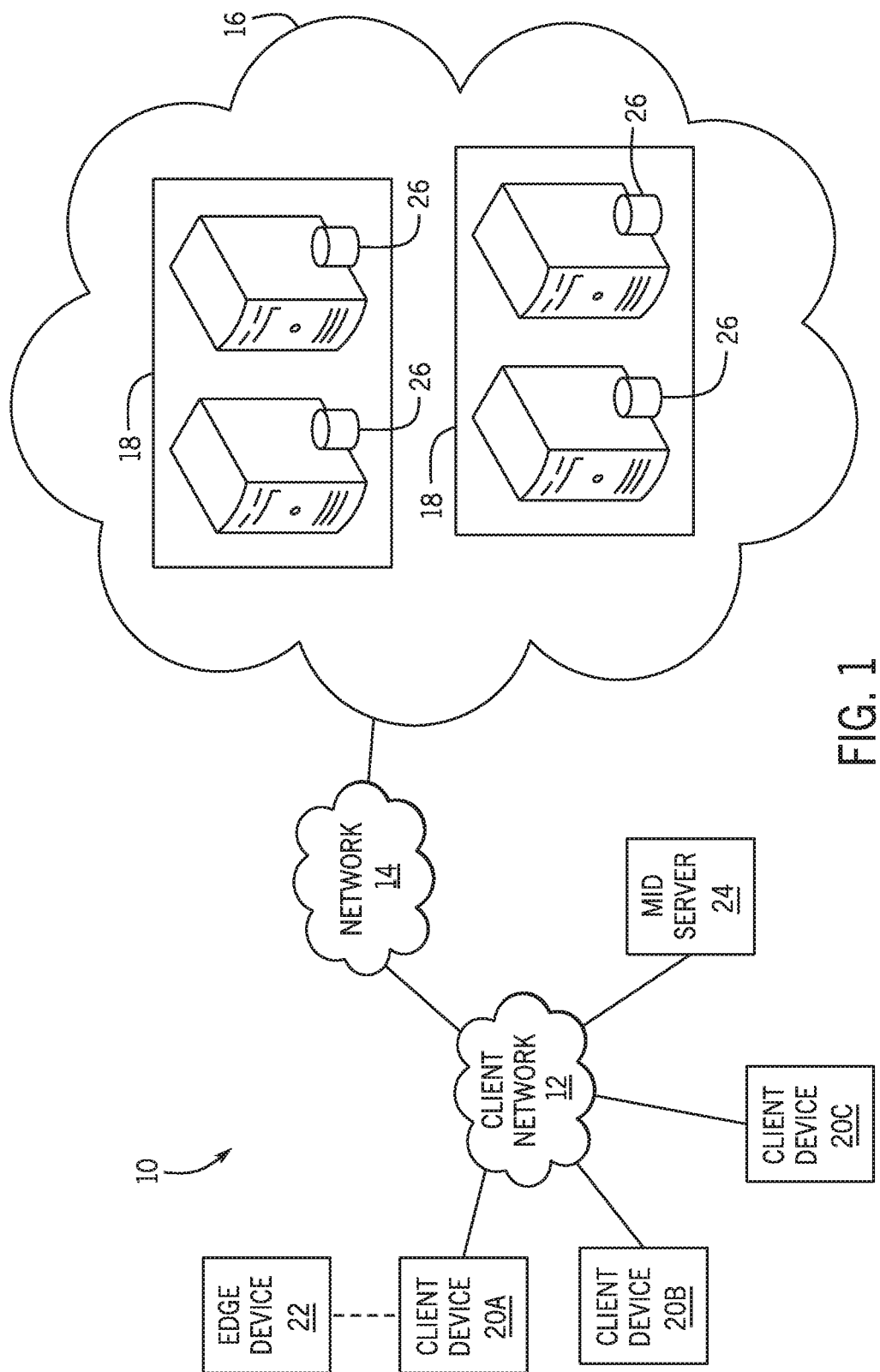
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, an "integration hub" is an application that enables execution of entitled transactions via one or more spokes, as well as tracking of entitlements and transactions. As used herein, a "transaction" refers to an exchange of information with an external server. As used herein, an "entitlement" refers to a purchased or assigned right to execute a transaction. As used herein, a "spoke" or "connector" refers to a scoped application that is integrated with IH to provide functionality to communicate with the external server. As used herein, a "flow" refers to a set of actions (e.g., a portion of an application) that is executed to achieve a particular effect. As used herein, a "subflow" refers to a portion of a flow. As used herein, an "action" refers to one or more instructions that are executed as a step in a flow or subflow. As used herein, an "integration action" is an action that includes a transaction. As such, it may be understood that each integration action involves a transaction that executes a particular spoke, wherein the spoke is designed to facilitate the exchange of information with the external server.

Present embodiments are directed to a transaction licensing system (TLS) for a cloud-based platform. The TLS includes an integration component, referred to herein as an integration hub (IH), having instructions to enable the identification, execution, and tracking of transactions. When a client purchases access to IH, the corresponding client instance is allotted a predefined number of transactions in a general entitlement pool. The client may also purchase access to an application (e.g., a human resources (HR) application, an operational security (OPSEC) application) that includes integration actions. Accordingly, the client instance may be allotted a predefined number of transactions in a specialized entitlement pool that is associated with executing transactions of the application. When these applications are executed, an entitlement from the specialized entitlement pool is consumed for each integration action executed. However, when an integration action that is not associated with a specialized entitlement pool is executed, an entitlement from the general entitlement pool is consumed. When the client instance has exhausted all entitlements in the general and specialized entitlement pools, the client is no longer able to execute integration actions using IH until additional entitlements are purchased.

To enable this functionality, the disclosed TLS is designed to determine identifying information for a transaction, such as the spoke, the protocol, the calling scope, and the action associated with the transaction. The TLS uses this identifying information to determine whether a specialized or general entitlement pool is associated with the transaction and has entitlements remaining. When a specialized entitlement pool is available, an entitlement from the specialized entitlement pool is consumed to perform the transaction. When a specialized entitlement pool is not available and the general entitlement pool is available, an entitlement from the customer's general entitlement pool may be consumed to perform the transaction. When no entitlements remain in the specialized or general entitlement pools associated with the transaction, an exception is raised indicating that the client is no longer in compliance with the licensing strategy. In certain embodiments, in addition to raising the exception, the TLS may block or prevent the transaction from being performed.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
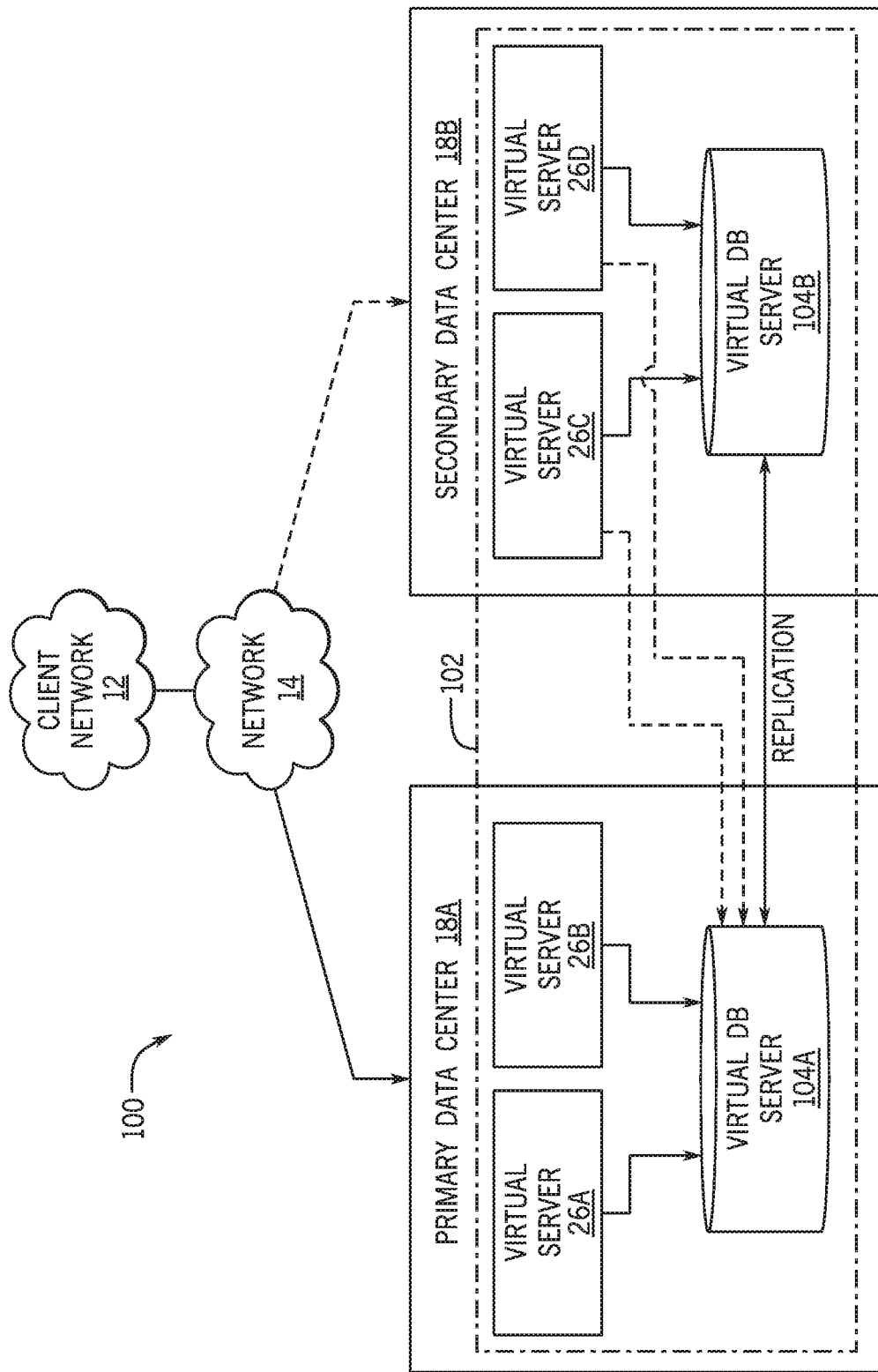
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
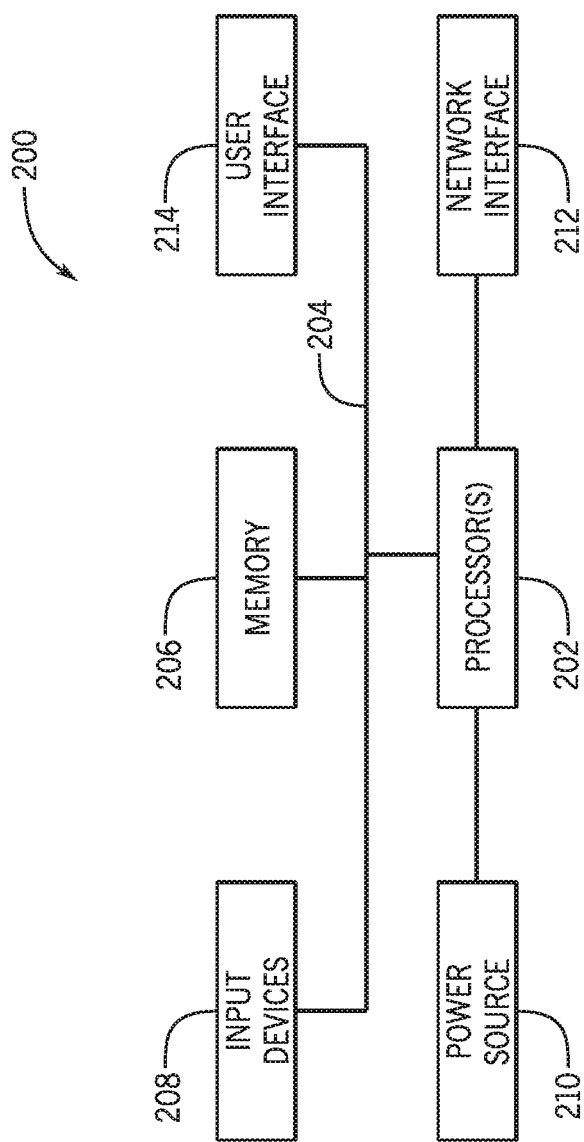
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
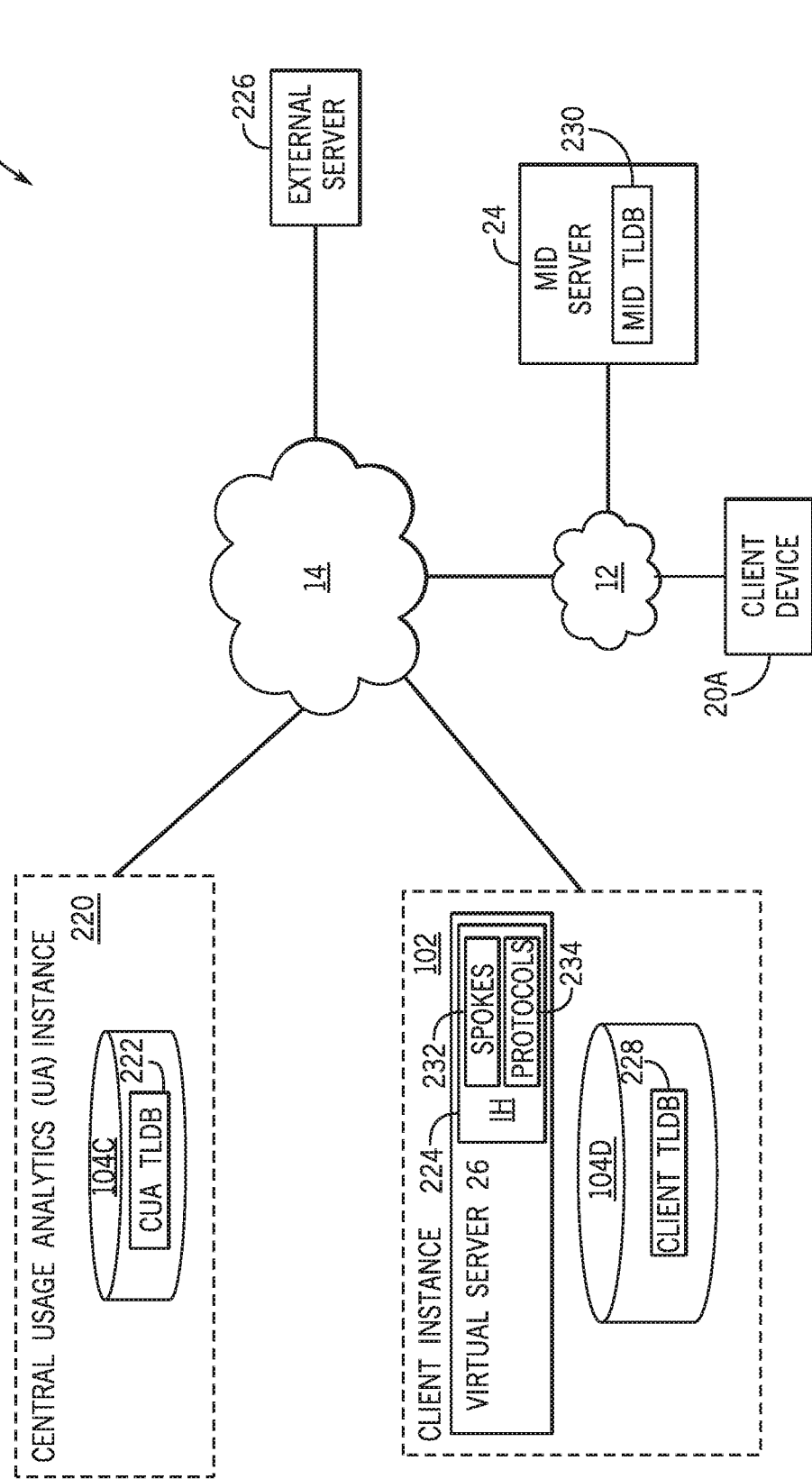
FIG. 4 is a block diagram illustrating an embodiment of a cloud-based computing platform that includes a transaction licensing system (TLS), in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20A via the network 14 to provide a user interface to network applications executing within the client instance 102 (e.g., via a web browser of the client device 20A). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20A, concurrently, wherein each end-user device is in communication with the single client instance 102. Also, cloud provider infrastructures may be configured to support any number of client instances, such as client instance 102, concurrently, with each of the instances in communication with one or more end-user devices.

More specifically, FIG. 4 illustrates an embodiment of a transaction licensing system (TLS) 218 of the cloud-based platform 16. For the illustrated embodiment, the TLS 218 includes the client instance 102, MID server 24, and a central Usage Analytics (UA) instance 220, which are communicatively coupled via the network 14. The central UA instance 220 is a shared or common instance that is communicatively coupled to multiple client instances 102 via the network 14. A database server 104C of the central UA instance 220 hosts a transaction licensing database (TLDB) storing transaction and entitlement information for multiple client instances 102, which is referred to as the CUA TLDB 222 for clarity. For example, the CUA TLDB 222 may include an entitlement table that stores information regarding entitlements that are based on purchased licensing packages or applications. The CUA TLDB 222 may include a transaction table that stores information regarding transactions that have been executed by various clients. As discussed below, the CUA TLDB 222 serves as a centralized TLDB, and as such, other components of the TLS 218 post transaction data to the CUA TLDB 222.

The virtual server 26 of the client instance 102 hosts an integration hub (IH) 224. The IH 224 includes instructions, as discussed below, which enable transaction license management within the TLS 218. More specifically, the IH 224 includes instructions to determine whether an action is an integration action that includes a transaction; to determine whether the transaction is entitled to be executed based on the license bundle purchased by the client; to execute the transaction to communicate with an external server 226; and to track transaction and entitlement information. As discussed below, in certain embodiments, the virtual server 26 may execute the instructions of the IH 224 to perform these functions. In other embodiments, the MID server 24 may store and execute certain instructions of the IH 224 to enable operation of the TLS 218, as discussed below.

For the embodiment illustrated in FIG. 4, the database server 104 of the client instance 102 hosts a TLDB that stores transaction and entitlement information specifically for the client instance 102, which is referred to as the client TLDB 228 for clarity. Like the CUA TLDB 222 discussed above, the client TLDB 228 may include an entitlement table that stores information regarding entitlements that have been allotted to the client instance 102 based on licensing packages or bundles purchased by the client. Similarly, the client TLDB 228 may include a transaction table that stores information regarding transactions that have been attributed to the client instance 102, whether they were executed by the virtual server 26 of the client instance 102 or by the MID server 24, as discussed below. For the illustrated embodiment, the IH 224 also includes instructions that post transaction and/or entitlement data from the client TLDB 228 to the CUA TLDB 222 to synchronize the databases. Additionally, in certain embodiments, the IH 224 includes instructions that enable entitlement and/or transaction data in the client TLDB 228 to be populated or periodically updated based on entitlement and/or transaction data stored in the CUA TLDB 222.

Additionally, for situations in which the MID server 24 executes the transaction, the MID server 24 also maintains a local TLDB, referred to herein as the MID TLDB 230 for clarity. Like the CUA TLDB 222 discussed above, the MID TLDB 230 may include an entitlement table that stores information regarding entitlements that have been allotted to the client instance 102 based on licensing packages or bundles purchased by the client. Similarly, the MID TLDB 230 may include a transaction table that stores information regarding transactions that have been executed by the MID server 24. As discussed below, the MID server 24 also includes instructions that post transaction data from the MID TLDB 230 to the client instance 102 and/or to the CUA TLDB 222 to synchronize the databases. Additionally, in certain embodiments, the IH 224 includes instructions that enable entitlement and/or transaction data in the MID TLDB 230 to be populated or periodically updated based on entitlement and/or transaction data stored in the CUA TLDB 222.

The IH 224 includes a number of components that enable operation of the TLS 218. For the illustrated example, the IH 224 includes a number of spokes 232, wherein certain spokes 232 may be associated with different external servers or services. For example, the spokes 232 may include a "BOX" spoke that uploads files to the external server 226 (e.g., https://www.box.com). Each of the spokes 232 is associated with at least one of a set of network communication protocols 234. For example, the protocols 234 may include Representational State Transfer (REST), Simple Object Access Protocol (SOAP), Java Database Connectivity (JDBC), Secure Shell (SSH), PowerShell, or another suitable network communication protocol. With this in mind, certain entitlements stored in a TLDB (e.g., CUA TLDB 222, client TLDB 228, or MID TLDB 230) may be specialized entitlements that are associated with the use of particular spokes 232 and protocols 234, while other entitlements may be general entitlements that may be used to execute any of the spokes 232 or the protocols 234, depending on the licensing bundles of the client.

Figure 5:
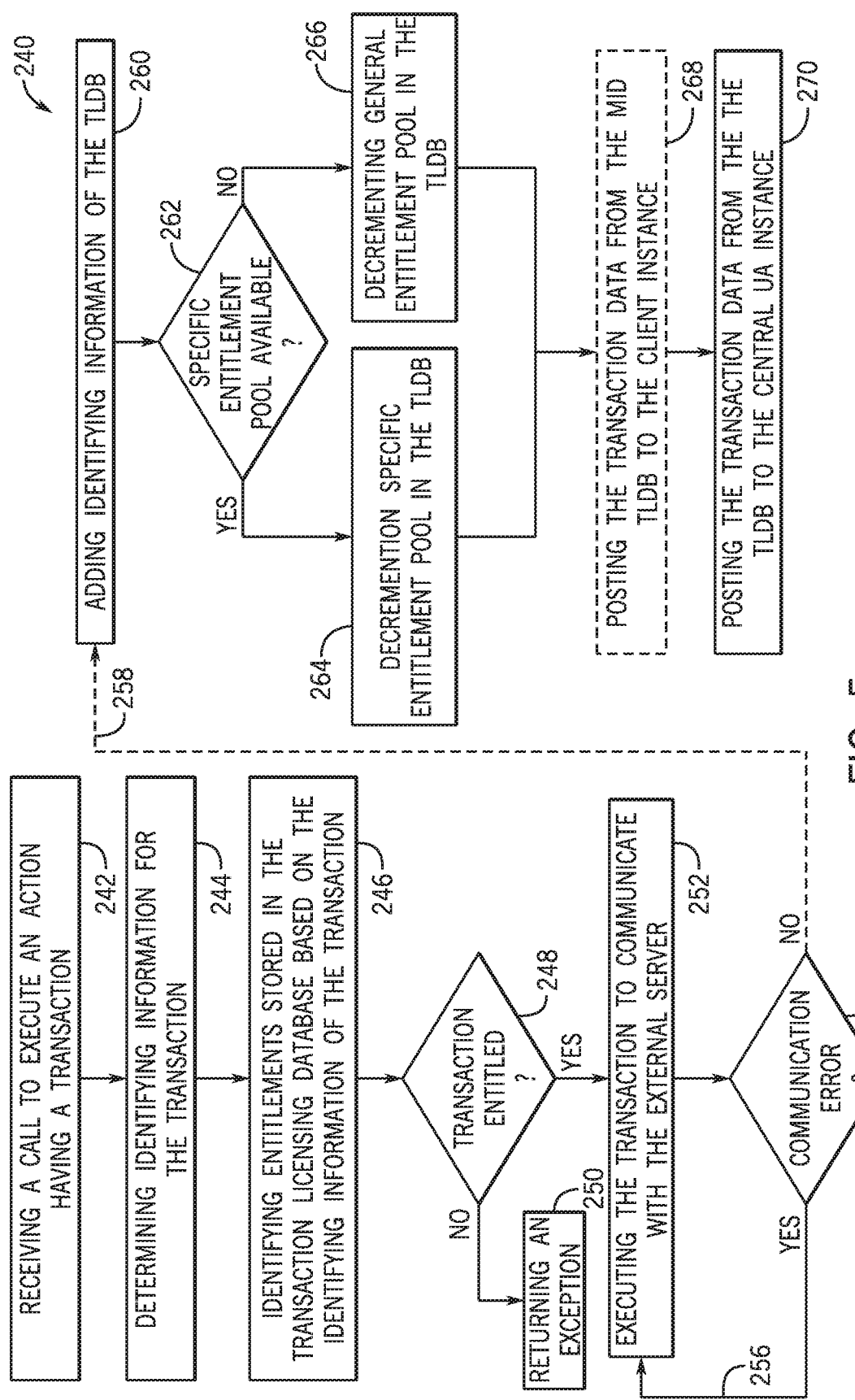
FIG. 5 is a flow diagram of an embodiment of a process for managing transactional licensing within the TLS, in accordance with aspects of the present disclosure.

FIG. 5 is a flow diagram of an embodiment of a process 240 for managing transactional licensing within the TLS 218, in accordance with aspects of the present approach. As such, the process 240 may be stored in a suitable memory (e.g., memory 206) and executed by one or more suitable processors (e.g., processor 202) of the TLS 218. More specifically, as discussed below, in certain embodiments, the process 240 may be executed by the virtual server 26 hosting the IH 224 within the client instance 102, while in other embodiments, the process 240 may be executed by a processor of the MID server 24. For embodiments in which the process 240 is executed by the client instance 102, unless otherwise clarified, the TLDB referenced in FIG. 5 refers specifically to the client TLDB 228. For embodiments in which the process 240 is executed by the MID server 24B, unless otherwise clarified, the TLDB referenced in FIG. 5 refers specifically to the MID TLDB 230. The illustrated embodiment of the process 240 begins with the processor 202 receiving (block 242) a call to execute an action that includes a transaction. For example, in block 242, the processor 202 may determine that an executing flow or application includes an action, wherein the action is an integration action that includes a transaction to upload a file to the external server 226. However, before the integration action can be executed, the TLS 218 determines whether the transaction is entitled to be executed based on the entitlements of the client stored in the TLDB.

For the embodiment illustrated in FIG. 5, a process 240 continues with the processor 202 determining (block 244) identifying information for the transaction. For example, in certain embodiments, the identifying information may include references to the spoke, protocol, caller scope, or action associated with the transaction, or a combination thereof. For example, the protocol of the transaction may be a reference (e.g., unique identifier, pointer) indicating one of the protocols (e.g., REST, SOAP, JDBC, SSH, PowerShell) of the IH 224. The caller scope may be a reference (e.g., a unique identifier, pointer) indicating the application, flow, or subflow that is responsible for triggering the integration action. For example, a flow may include a first integration action and a subflow, wherein the subflow includes a second integration action. For this example, when the flow is executed, the caller scope of the first integration action will be a reference to the flow, and the caller scope of the second integration action will be a reference to the subflow. The action is a reference (e.g., a unique identifier, pointer) to the integration action that includes the transaction. In certain embodiments, the identifying information for the transaction may include an action scope of the transaction, which is a reference (e.g., a unique identifier. pointer) to the application, flow, or subflow of the action having the transaction is defined. It may be appreciated that, when an action is executed as part of the flow or subflow in which it is defined, the action scope and the caller scope may be the same. However, when an action of a flow is triggered and executed separately from the flow in which it is defined, then the caller scope is the flow responsible for triggering the execution of the action defines the caller scope, which will be different from the action scope.

For the embodiment illustrated in FIG. 5, a process 240 continues with the processor 202 identifying (block 246) entitlements stored in a TLDB based on the identifying information of the transaction determined in block 244. For example, the processor 202 may query the entitlement table of the TLDB using the identifying information to determine the entitlements the client instance 102 has been allotted that correspond to the transaction. By way of specific example, the processor 202 may query the TLDB using the references to the spoke, the protocol, the caller scope, and the action determined in block 244 to identify entitlements available to the client that correspond to the transaction. For example, the processor 202 may determine that there are two entitlement pools that correspond to the transaction: a general entitlement pool that is associated with the client, and a specialized entitlement pool that is associated a particular application or flow. For this example, both entitlement pools include a numerical value indicating a number of entitled transactions remaining in each pool.

It may also be noted that, in certain embodiments, the general entitlement pool may be restricted to particular types of transactions. In such situations, a transaction may not be entitled to be executed even if entitlements remain in a general entitlement pool. For example, one licensing bundle strategy may include different licensing tiers, such as a bottom tier that includes a general entitlement pool having a number of transactions, a middle tier that includes a general entitlement pool having a relatively greater number of transactions, and a top tier that includes a general entitlement pool having a relatively greatest number of transactions. Additionally, the bottom tier may be limited to executing transactions via particular spokes 232 and protocols 234, while the middle tier can execute transactions via additional spokes 232 and protocols 234, and the top tier can execute transactions via all spokes and protocols of the IH 224. As such, in block 246, the processor 202 ensures that the identified entitlement pools are suitable or applicable to the transaction.

For the embodiment illustrated in FIG. 5, a process 240 continues with the processor 202 determining whether (decision block 248) the transaction is entitled to be executed, based on the entitlements identified in block 246. For example, in block 246, the processor 202 may fail to identify entitlements pools with entitlements remaining that can be applied to execute the transaction. As such, in decision block 248, the processor 202 may respond by returning (block 250) an exception to the execution of the action, wherein the exception may indicate that the client is not currently entitled to execute the action based on the current license package and license usage of the client. As noted, in certain embodiments, the processor 202 may allow the transaction to proceed despite the lack of available entitlements, and may raise the exception such that is noted within one or more logs (e.g., usage logs, transaction logs, exception logs, error logs) that the transaction was not entitled. For such embodiments, clients may continue to execute unentitled transactions, which avoids non-functionality of applications, scripts, and flows due to the lack of suitable entitlements. Additionally, for such embodiments, routine audits of the logs can be performed to identify clients that should adjust their licensing plan to bring them back into compliance. In other embodiments, the processor 202 raises the exception and blocks the unentitled transaction from being performed, which forces the client to remain in compliance with the purchased licensing plan. When the processor 202 determines in decision block 248 that there are one or more entitlement pools with entitlements available to execute the transaction, then the processor 202 responds by executing (block 252) the transaction of the action to communicate with the external server 226. More specifically, the processor 202 executes the spoke of the transaction determined in block 244 to exchange data with the external server 226.

It is presently recognized that, in certain situations, the communication with the external server 226 may not be successful. For example, in certain situations, the external server 226 or a portion of the network 14 may be inoperable (e.g., offline for maintenance) when the transaction is executed in block 252. As such, it is presently recognized that entitlements from an entitlement pool could be quickly and undesirably consumed by repeated, unsuccessful attempts to execute the transaction to communicate with the external server 226. With this in mind, during execution of the transaction in block 252, the processor 202 may monitor the communication to determine (decision block 254) whether a communication error has occurred. When a communication error is encountered, then the processor 202 may respond by repeating execution of the transaction, based on the initial entitlement, until the communication error is no longer encountered, as indicated by the arrow 256. As such, it may be appreciated that the illustrated embodiment of the process 240 does not consume additional entitlements as a result of communication errors. Additionally, in certain embodiments, once the processor 202 has made multiple unsuccessful attempts to communicate with the external server 226, the processor 202 return an exception indicating the communication errors.

Continuing through the embodiment of the process 240 of FIG. 5, the successful execution of the transaction without communication errors triggers the execution of additional steps, as indicated by the dashed arrow 258, to record the transaction and to adjust the entitlements based on the execution of the transaction. It may be appreciated that, in order to maintain efficient execution, the remaining steps of the process 240 may be separately performed (e.g., by another processor 202) while the execution of the flow that invoked the action may be resumed without additional delay. For the illustrated embodiment, these steps include adding (block 260) at least a portion of the identifying information of the transaction to the TLDB. For example, the processor 202 may create a record in a transaction table of the TLDB that includes the references to the spoke, protocol, caller scope, and action of the transaction determined in block 244. Additionally, the transaction record may include other transaction data, such as client identifiers, timestamps, user account details, or other suitable identifying or audit-related information relating to the transaction.

For the illustrated embodiment, the process 240 continues with the processor 202 determining whether (decision block 262) there is a specialized entitlement pool with available entitlements that corresponds to the transaction. For example, the processor 202 may have identified one or more entitlement pools in block 246 that can be consumed to execute the transaction. These entitlement pools may include one or more specialized entitlement pools having entitlements that can be consumed only by transactions having a particular spoke, a particular protocol, a particular caller scope, and/or a particular action. For example, in certain embodiments, each specialized entitlement pool may be defined as a record stored in an entitlement table of the TLDB, and each record may include fields that store a caller scope, spokes, allowed actions, and the number of entitlements in the pool.

As such, when the processor 202 determines in block 262 that a specialized entitlement pool has available entitlements that correspond to the identifying information of the transaction, then the processor decrements (block 264) the value of the specialized entitlement pool in the TLDB. In situations in which more than one specialized entitlement pool with available entitlements is identified in block 246, the processor 202 may select which specialized entitlement pool to decrement in block 264 based on a predefined entitlement pool priority. For example, in certain embodiments, the processor 202 may select the specialized entitlement pool having the greatest number of entitlements to decrement in block 264. The entitlement pools may also include a general entitlement pool having entitlements that are consumed by all suitable transactions that are not attributed to the specialized entitlement pools. When the processor 202 determines that there is not a specialized entitlement pool with entitlements available, then the processor 202 responds by decrementing (block 266) the general entitlement pool in the TLDB.

As mentioned, in certain embodiments, the process 240 may be executed by the MID server 24. For such embodiments, the process 240 includes an additional step in which the processor of the MID server 24 posts (block 268) the transaction data from the MID TLDB 230 to the client TLDB 228 of the client instance 102. It may be appreciated that, in certain embodiments, the MID server 24 may collect data for multiple transactions before transmitting the transaction data to the client instance 102. For example, in certain embodiments, the MID server 24 may be programmed to provide the transaction data to the client instance 102 as part of a scheduled job, or in response to a request from the client instance 102 to provide this data. In certain embodiments, the MID server 24 may also provide entitlement data from the MID TLDB 230 to the client TLDB 228, while in other embodiments, the virtual server 26 of the client instance 102 may execute instructions to adjust entitlement data stored in the client TLDB 228 based on the transaction data received from the MID server 24.

For the illustrated embodiment, the process 240 concludes with the processor 202 posting (block 270) the transaction data stored in the TLDB to the central UA instance 220. For embodiments in which the virtual server 26 of the client instance 102 executes the process 240, the virtual server 26 executes instructions to transfer transaction data from the client TLDB 228 to the CUA TLDB 222. For embodiments in which the MID server 24 executes the process 240, the MID server 24 executes instructions to transfer transaction data from the MID TLDB 230 to the CUA TLDB 222. It may be appreciated that, in certain embodiments, the processor 202 may provide multiple transaction records to the central UA instance 220 in batch form. For example, in certain embodiments, the processor 202 may be programmed to provide the transaction data to the CUA TLDB 222 of the central UA instance 220 as part of a scheduled job, or in response to a request from the central UA instance 220. In certain embodiments, the processor 202 may also provide entitlement data to the CUA TLDB 222, while in other embodiments, a virtual server of the central UA instance 220 may execute instructions to adjust entitlement data stored in the CUA TLDB 222 based on the received transaction data.

Figure 6:
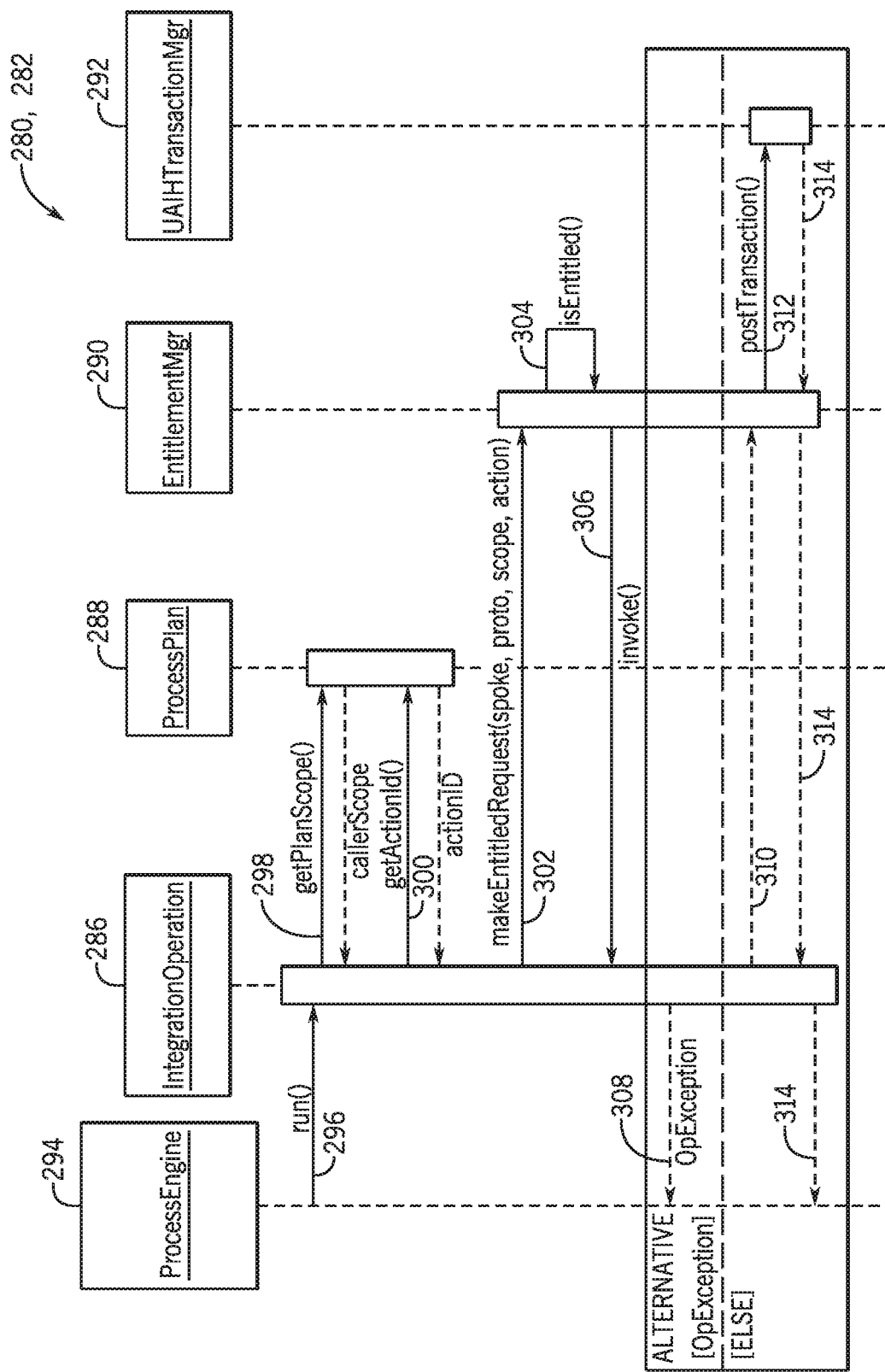
FIG. 6 is an execution flow diagram illustrating an embodiment of a process by which the client instance manages transactional licensing in the TLS, in accordance with aspects of the present disclosure.
Figure 7:
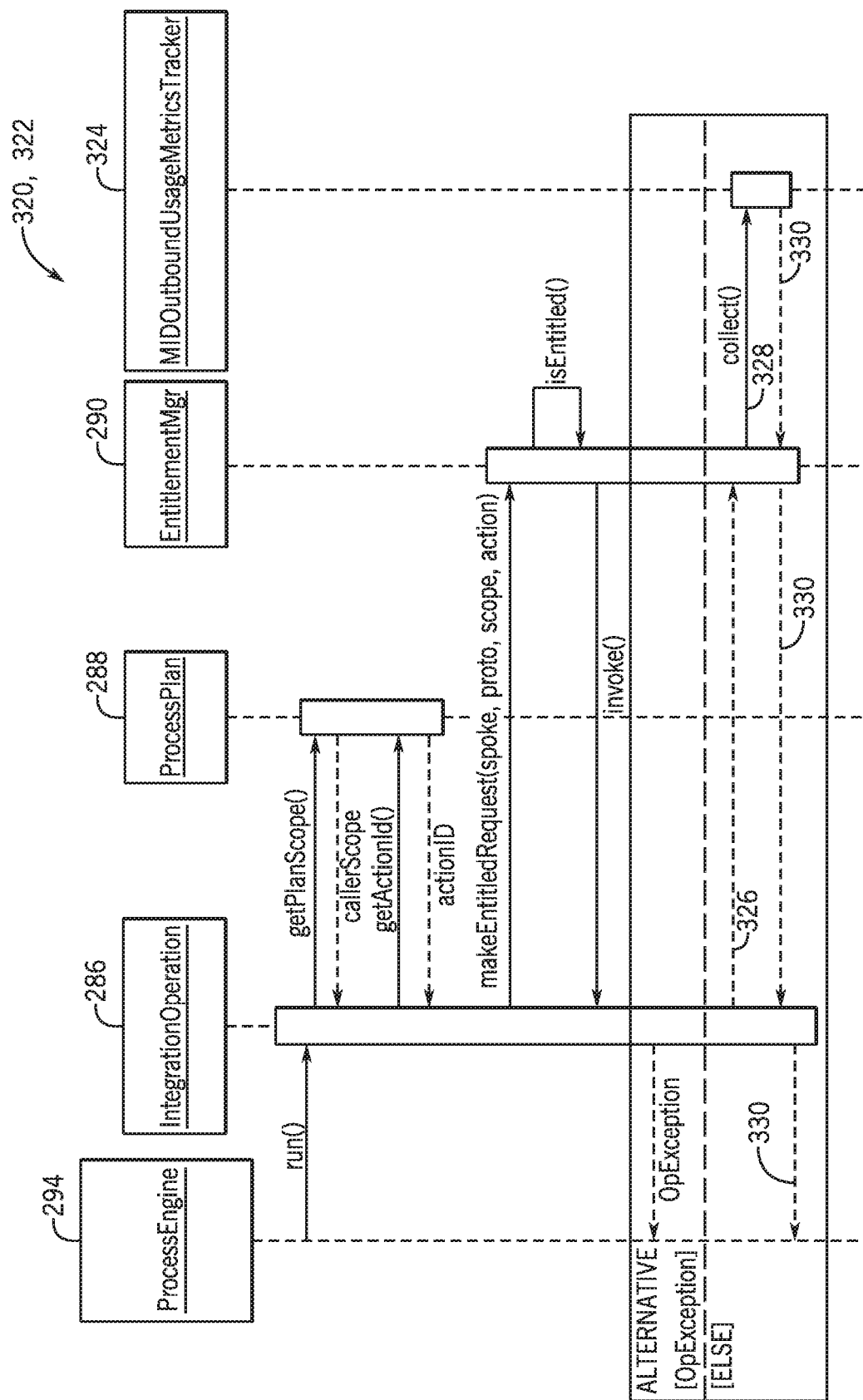
FIG. 7 is an execution flow diagram illustrating an embodiment of a process by which a MID server associated with the client instance manages transactional licensing in the TLS, in accordance with aspects of the present disclosure.
Figure 8:
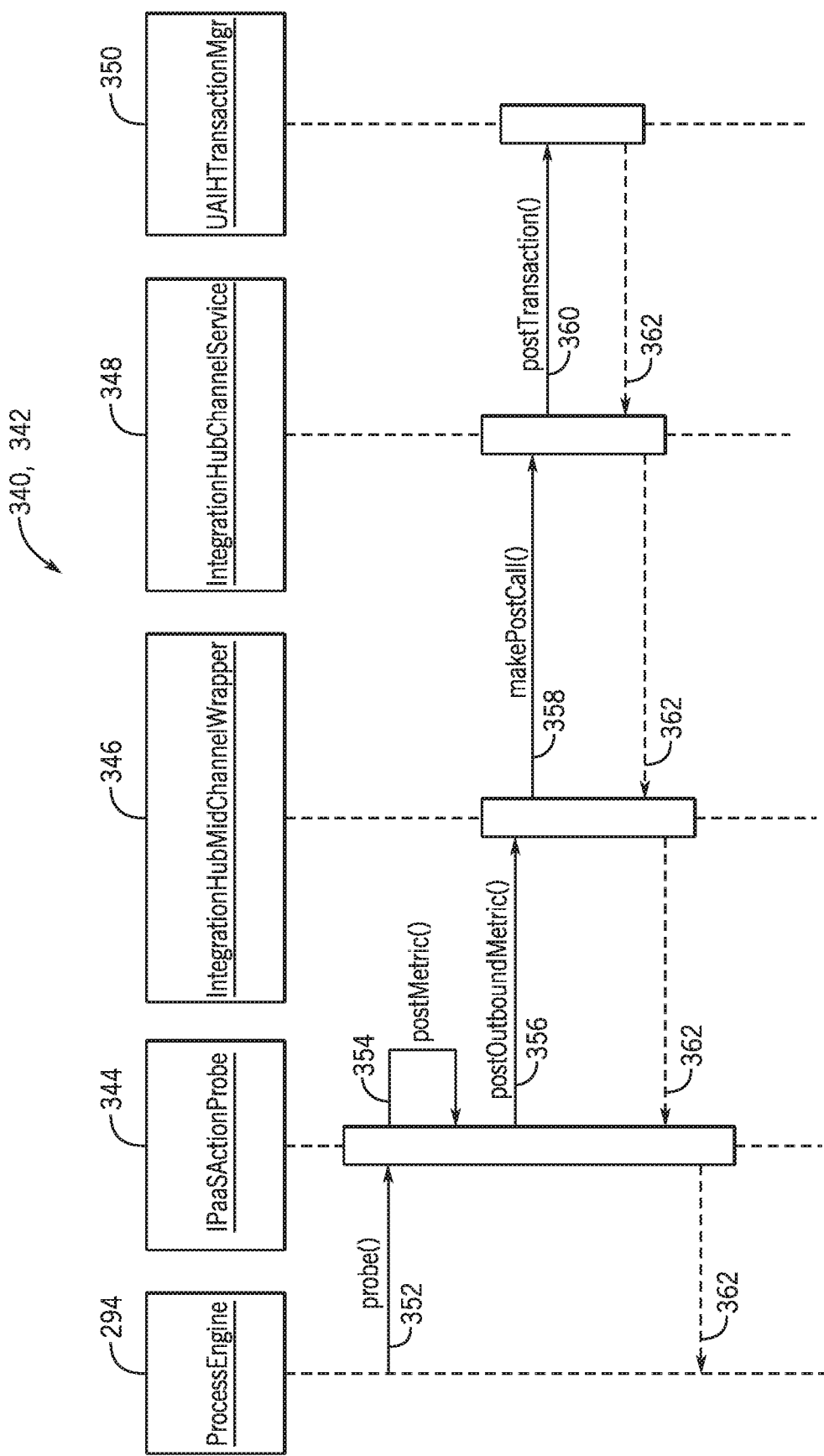
FIG. 8 is an execution flow diagram illustrating an embodiment of a process by which the MID server posts transaction information to a central UA instance in the TLS, in accordance with aspects of the present disclosure.

FIGS. 6-8 are execution flow diagrams illustrating embodiments in which portions of the process 240 of FIG. 5 are executed by the virtual server 26 of the client instance 102 or by the MID server 24. It may be noted that the names and organization of the classes illustrated in these figures are merely provided as an example, and these may be different in other embodiments. Additionally, it may be noted that these figures are discussed with reference to elements illustrated in FIG. 4.

With the foregoing in mind, FIG. 6 is an execution flow diagram 280 illustrating an embodiment of a process 282 by which the virtual server 26 of the client instance 102 manages transactional licensing, in accordance with aspects of the present disclosure. As illustrated, the IH 224 hosted by the virtual server 26 has a number of classes or objects, including: an IntegrationOperation class 286, a ProcessPlan class 288, an EntitlementMgr class 290, and a UAIHTransactionMgr class 292 that cooperate to enable operation of the TLS 218. The virtual server 26 also hosts a ProcessEngine class 294 that executes flows of the client instance 102 in response to trigger events.

The illustrated process 282 begins with the ProcessEngine class 294 attempting to execute an action using a run( ) function (arrow 296). The IntegrationOperation class 286 receives the call to execute the action and determines that the action is an integration action that includes a transaction. In response, the IntegrationOperation class 286 performs a first call to the ProcessPlan class 288 to determine the caller scope of the transaction using a getPlanScope( ) function (arrow 298) that returns a reference to the caller scope of the action, which is determined as discussed above. The IntegrationOperation class 286 performs a second call to the ProcessPlan class 288 to determine the identity of the action using a getActionid( ) function (arrow 300) that returns a reference to the action back to the IntegrationOperation class 286.

The illustrated embodiment of the process 282 continues with the IntegrationOperation class 286 calling the EntitlementMgr class 290 to determine whether or not the transaction is entitled using the makeEntitledRequest( ) function, which receives as inputs references to the spoke, the protocol, the caller scope, and the action associated with the transaction (arrow 302). The EntitlementMgr class 290 receives the call from the IntegrationOperation class 286 and checks entitlements stored in the client TLDB 228 to determine whether the transaction is entitled using the isEntitled ( ) function (arrow 304). When the EntitlementMgr class 290 determines that there is a suitable entitlement available that corresponds to the transaction, the EntitlementMgr class 290 calls the IntegrationOperation class 286 to execute the action using the defined invoke( ) function (arrow 306).

For the illustrated embodiment, if the IntegrationOperation class 286 does not receive the invoke( ) call from the EntitlementMgr class 290, then the IntegrationOperation class 286 returns an exception to the ProcessEngine class 294 (arrow 308). Otherwise, at some point after beginning execution of the action, the IntegrationOperation class 286 signals the EntitlementMgr class 290 (arrow 310), and in response, the EntitlementMgr class 290 signals the UAIHTransactionMgr class 292 using the postTransaction ( ) function (arrow 312). The UAIHTransactionMgr class 292 provides the transaction and/or entitlement data related to the transaction to the central UA instance 220, and then returns a confirmation message that is propagated through the EntitlementMgr class 290 and the IntegrationOperation class 286 to reach the ProcessEngine class 294, as indicated by the arrows 314.

FIG. 7 is an execution flow diagram 320 illustrating an embodiment of a process 322 by which the MID server 24 manages transactional licensing, in accordance with aspects of the present disclosure. As illustrated, the MID server 24 has a number of classes or objects, including: the IntegrationOperation class 286, the ProcessPlan class 288, the EntitlementMgr class 290, and a MIDOutboundUsageMetricsTracker class 324 that cooperate to enable operation of the TLS 218. The MID server 24 also hosts a ProcessEngine class 294 capable of executing applications or flows that are pushed from the client instance 102.

It may be appreciated that the process 322 illustrated in FIG. 7 is substantially similar to the process 282 illustrated in FIG. 6 discussed above. However, in FIG. 7, at some point after beginning execution of an entitled action, the IntegrationOperation class 286 signals the EntitlementMgr class 290 (arrow 326), and in response, the MIDOutboundUsageMetricsTracker class 324 sends the transaction and/or entitlement data related to the transaction to the client TLDB 228 of client instance 102 using the collect( ) function (arrow 328). In response to sending the transaction and/or entitlement data to the client instance 102 the MIDOutboundUsageMetricsTracker class 324 returns a confirmation message that is propagated through the EntitlementMgr class 290 and the IntegrationOperation class 286 to reach the ProcessEngine class 294, as indicated by the arrows 330.

FIG. 8 is an execution flow diagram 340 illustrating an embodiment of a process 342 by which the MID server 24 posts transaction and/or entitlement data to the central UA instance 220, in accordance with aspects of the present disclosure. As illustrated, the MID server 24 has a number of classes or objects, including: an IPaasActionProbe class 344, an IntegrationHubMidChannelWrapper class 346, an IntegrationHubMIDChannelService class 348, and the UAIHTransactionMgr class 350 that cooperate to enable a portion of the operation of the TLS 218. As mentioned, the MID server 24 also hosts the ProcessEngine class 294, which is capable of executing applications or flows that are pushed from the client instance 102.

The illustrated process 342 begins with the ProcessEngine class 294 signaling that the transaction and/or entitlement information should be sent to the central UA instance 220 using a probe( ) function (arrow 352). The IPaasActionProbe class 344 receives the signal from the ProcessEngine class 294 and performs a call to generate metric data using a postMetrics( ) function (arrow 354). The IPaasActionProbe class 344 then performs a second call using the postOutboundMetrics( ) function to send out the outbound metric data (arrow 356), which includes the transaction and/or entitlement data. The IntegranonHubMidChannelWrapper class 346 receives the call from the IPaasActionProbe class 344 and signals the IntegrationHubMIDChannelService class 348 to post the outbound metric data using the makePostCall( ) function (arrow 358). The IntegrationHubMIDChannelService class 348 gleans transaction and/or entitlement data from the outbound metric data and then sends this to the UAIHTransactionMgr class 350 using the postTransaction( ) function (arrow 360). The UAIHTransactionMgr class 350 sends the transaction information to the central UA instance 220, and then returns a confirmation message that is propagated through the IntegrationHubMIDChannelService class 348, the IntegranonHubMidChannelWrapper class 346, and the IPaasActionProbe class 344 to reach the ProcessEngine class 294, as indicated by the arrows 362.

The technical effects of the disclosed technique include a transaction licensing system (TLS). The disclosed TLS is designed to determine identifying information for a transaction, such as the spoke, the protocol, the calling scope, and the action associated with the transaction. The TLS uses this identifying information to determine whether a general or specialized entitlement pool associated with the transaction has entitlements remaining in a transaction licensing database (TLDB). When a suitable specialized entitlement pool is available, an entitlement from the specialized entitlement pool is consumed to perform the transaction. When a suitable specialized entitlement pool is not available and a suitable general entitlement pool is available, an entitlement from the general entitlement pool is consumed to perform the transaction. When no suitable entitlement pools are identified, the TLS returns an exception. As such, the disclosed TLS enables an improved system for allotting entitlements and tracking transactions in a cloud computing environment.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A transaction licensing system (TLS), comprising:
at least one memory configured to store a general entitlement pool, a specialized entitlement pool, a process engine class, an integration operation class, a process plan class, and an entitlement manager class; and
at least one processor configured to execute stored instructions of the integration operation class to perform steps, comprising:
receiving, from the process engine class, a call to execute an action;
determining that the action includes a transaction, wherein the transaction is a communication with an external server;
providing, to the entitlement manager class, a request to determine whether the transaction is entitled to be executed, wherein the request comprises identifying information for the transaction;
receiving, from the entitlement manager class, an indication that the transaction is entitled to be executed based on the identifying information of the transaction and available entitlements in the general entitlement pool or the specialized entitlement pool; and
invoking the transaction to communicate with the external server in response to receiving the indication that the transaction is entitled.

2. The TLS of claim 1, wherein the at least one processor is configured to execute the stored instructions of the integration operation class to perform steps, comprising:
after invoking the transaction:
providing, to the entitlement manager class, an indication that the transaction has been invoked;
receiving, from the entitlement manager class, a confirmation that the general entitlement pool or the specialized entitlement pool has been decremented; and
providing, to the process engine class, the confirmation that the general entitlement pool or the specialized entitlement pool has been decremented.

3. The TLS of claim 2, wherein the at least one memory is configured to store a transaction manager class, and the at least one processor is configured to execute the stored instructions of the entitlement manager class to perform steps, comprising:
in response to receiving the indication that the transaction has been invoked:
providing, to the transaction manager class, a collection request that includes the identifying information of the transaction, wherein the transaction manager is configured to decrement the available entitlements in the general entitlement pool or the specialized entitlement pool based on the identifying information of the transaction in response to the collection request.

4. The TLS of claim 1, wherein the at least one processor is configured to execute the stored instructions of the integration operation class to perform steps, comprising:
returning, to the process engine class, an exception to the call to execute the action in response to receiving, from the entitlement manager class, an indication that the transaction is not entitled to be executed based on identifying information for the transaction and the available entitlements in the general entitlement pool or the specialized entitlement pool.

5. The TLS of claim 1, wherein the identifying information indicates a spoke of the transaction, a protocol of the transaction, a caller scope of the transaction, and the action that includes the transaction.

6. The TLS of claim 5, wherein the protocol indicates a Representational State Transfer (REST) protocol, a Simple Object Access Protocol (SOAP) protocol, a Java Database Connectivity (JDBC) protocol, a Secure Shell (SSH) protocol, or a PowerShell protocol.

7. The TLS of claim 1, wherein the at least one processor is a processor of a virtual server of a client instance, and the at least one memory is a memory of the virtual server of the client instance.

8. The TLS of claim 1, wherein the at least one processor is a processor of a measurement, instrumentation, and discovery (MID) server, and the at least one memory is a memory of the MID server.

9. A method of operating a transaction licensing system (TLS), comprising:
receiving, from a process engine class, a call to execute an action;
determining that the action includes a transaction, wherein the transaction is a communication with an external server;
providing, to an entitlement manager class, a request to determine whether the transaction is entitled to be executed, wherein the request comprises identifying information for the transaction;
receiving, from the entitlement manager class, an indication that the transaction is entitled to be executed based on the identifying information of the transaction and available entitlements in a general entitlement pool or a specialized entitlement pool; and
invoking the transaction to communicate with the external server in response to receiving the indication that the transaction is entitled.

10. The method of claim 9, wherein the identifying information indicates a spoke of the transaction, a protocol of the transaction, a caller scope of the transaction, and the action that includes the transaction.

11. The method of claim 9, comprising:
returning, to the process engine class, an exception to the call to execute the action in response to receiving, from the entitlement manager class, an indication that the transaction is not entitled to be executed based on identifying information for the transaction and the available entitlements in the general entitlement pool or the specialized entitlement pool.

12. The method of claim 9, comprising:
after invoking the transaction:
providing, to the entitlement manager class, an indication that the transaction has been invoked;
receiving, from the entitlement manager class, a confirmation that the general entitlement pool or the specialized entitlement pool has been decremented; and
providing, to the process engine class, the confirmation that the general entitlement pool or the specialized entitlement pool has been decremented.

13. The method of claim 12, comprising:
in response to receiving the indication that the transaction has been invoked:
providing, to a transaction manager class, a collection request that includes the identifying information of the transaction, wherein the transaction manager class is configured to decrement the general entitlement pool or the specialized entitlement pool based on the identifying information of the transaction in response to the collection request.

14. The method of claim 13, wherein the transaction manager class is configured to decrement the specialized entitlement pool in response to determining that an available specialized entitlement of the specialized entitlement pool is associated with the transaction.

15. The method of claim 13, wherein the transaction manager class is configured to decrement the general entitlement pool in response to determining that no specialized entitlements of the specialized entitlement pool are available and associated with the transaction.

16. A non-transitory, computer-readable medium storing instructions executable by at least one processor of a transaction licensing system (TLS), the instructions comprising instructions to:
   receive, from a process engine class, a call to execute an action;
   determine that the action includes a transaction, wherein the transaction is a communication with an external server;
   provide, to an entitlement manager class, a request to determine whether the transaction is entitled to be executed, wherein the request comprises identifying information for the transaction;
   receive, from the entitlement manager class, an indication that the transaction is entitled to be executed based on the identifying information of the transaction and available entitlements in a general entitlement pool or a specialized entitlement pool; and
   invoke the transaction to communicate with the external server in response to receiving the indication that the transaction is entitled.

17. The medium of claim 16, wherein the identifying information indicates a spoke of the transaction, a protocol of the transaction, a caller scope of the transaction, and the action that includes the transaction.

18. The medium of claim 16, wherein the instructions comprise instructions to:
   after invoking the transaction:
      provide, to the entitlement manager class, an indication that the transaction has been invoked;
      receive, from the entitlement manager class, a confirmation that a general entitlement pool or a specialized entitlement pool has been decremented; and
      provide, to the process engine class, the confirmation that the general entitlement pool or the specialized entitlement pool has been decremented.

19. The medium of claim 18, wherein the instructions comprise instructions to:
   in response to receiving the indication that the transaction has been invoked:
      provide, to the transaction manager class, a collection request that includes the identifying information of the transaction, wherein the transaction manager class is configured to decrement the general entitlement pool or the specialized entitlement pool based on the identifying information of the transaction in response to the collection request.

20. The medium of claim 19, wherein the transaction manager class is configured to decrement the specialized entitlement pool in response to determining that an available specialized entitlement of the specialized entitlement pool is associated with the transaction, and to decrement the general entitlement pool in response to determining that none of the available entitlements of the specialized entitlement pool are associated with the transaction.

* * * * *